(12) United States Patent
Haw

(10) Patent No.: US 8,537,480 B1
(45) Date of Patent: Sep. 17, 2013

(54) HARD DRIVE TESTING

(75) Inventor: Kwok Foong Haw, Shah Alam (MY)

(73) Assignee: Western Digital Technologies, Inc., Irvine, CA (US)

( * ) Notice: Subject to any disclaimer, the term of this patent is extended or adjusted under 35 U.S.C. 154(b) by 382 days.

(21) Appl. No.: 12/953,095

(22) Filed: Nov. 23, 2010

(51) Int. Cl.
*G11B 27/36* (2006.01)
*G11B 5/09* (2006.01)

(52) U.S. Cl.
USPC .............................................. 360/31; 360/53

(58) Field of Classification Search
None
See application file for complete search history.

(56) References Cited

U.S. PATENT DOCUMENTS

| | | | |
|---|---|---|---|
| 5,600,500 A | | 2/1997 | Madsen et al. |
| 7,253,978 B2 * | | 8/2007 | Lee et al. .......................... 360/31 |
| 7,489,461 B2 | | 2/2009 | Yun et al. |
| 7,529,049 B2 | | 5/2009 | Duan et al. |
| 7,895,480 B2 * | | 2/2011 | Maucksch ...................... 714/704 |
| 2002/0133763 A1 * | | 9/2002 | Fleischer-Reumann et al. ............. 714/704 |
| 2004/0252398 A1 * | | 12/2004 | Li et al. ........................... 360/66 |
| 2008/0198492 A1 * | | 8/2008 | Ahn ............................. 360/31 |
| 2008/0204913 A1 | | 8/2008 | Umezaki et al. |

\* cited by examiner

*Primary Examiner* — Regina N Holder

(57) ABSTRACT

A method for testing a hard drive includes determining a first partial bit error rate (PBERT) value of a hard drive at a first temperature and a second PBERT value of the hard drive at a second temperature. The method includes determining a PBERT minimum based on the first and second PBERT values, and comparing the PBERT minimum to a first PBERT minimum limit. The method includes determining a PBERT ratio based on the first and second PBERT values if the PBERT minimum is greater than or equal to the first PBERT minimum limit. The method includes comparing the PBERT ratio to a PBERT ratio limit, and comparing the PBERT minimum to a second PBERT minimum limit if the PBERT ratio is greater than the PBERT ratio limit. The method includes generating a failure indicator if the PBERT minimum is less than the first and/or second PBERT minimum limit.

20 Claims, 3 Drawing Sheets

HARD DRIVE TESTING

FIELD

The present invention generally relates to hard drive testing and, in particular, relates to hard drive testing involving bit error rates.

BACKGROUND

A hard drive may be tested under various conditions for determining whether the performance of the hard drive is consistent over the various conditions. For example, the bit error rate of the hard drive may be determined at a first temperature and compared to the bit error rate of the hard drive determined at a second temperature. The performance of the hard drive may be considered inconsistent if the difference between the two bit error rates is significant. Thus, the hard drive may be designated as a failure. To ensure reliability, a limit for the maximum allowable difference in bit error rates may be set such that even a small difference between the two bit error rates that exceeds the limit may indicate that the hard drive is a failure. On the other hand, setting the limit in this manner may also result in unnecessarily designating hard drives that may otherwise be suitable for use as failures. Therefore, it would be advantageous to test hard drives reliably without unnecessarily failing too many hard drives that may otherwise be suitable for use.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In certain instances, well-known structures and techniques have not been shown in detail so as not to obscure the subject technology.

Figure 1:
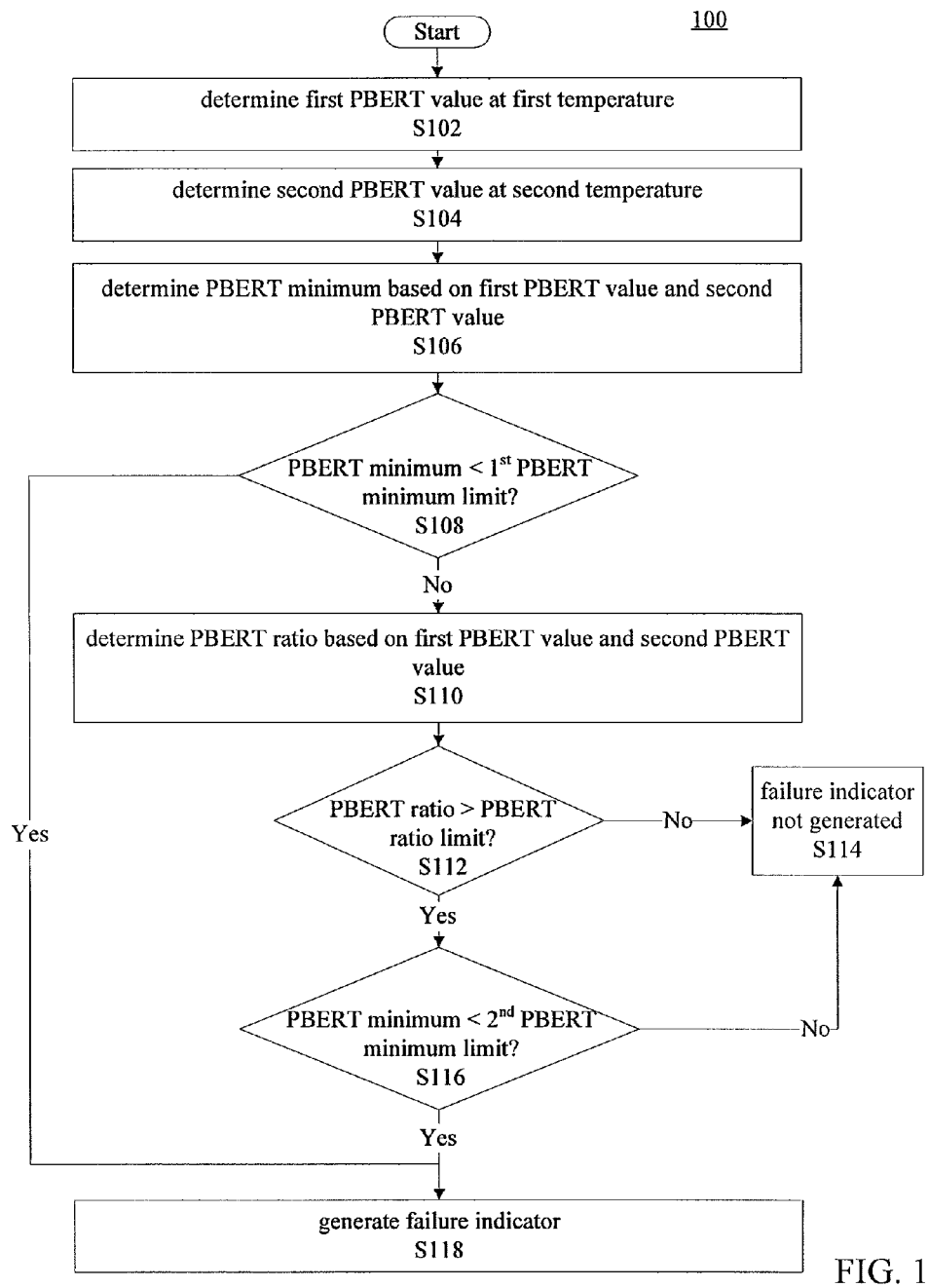
FIG. 1 illustrates a method for testing a hard drive, in accordance with various aspects of the subject technology.

FIG. 1 illustrates method 100 for testing a hard drive, in accordance with various aspects of the subject technology. In particular, method 100 may test the hard drive ("the tested hard drive") to determine whether or not the tested hard drive is considered a failure. In an initialization step at the "Start" of method 100, the tested hard drive is placed in an environment that may be exposed to various temperatures so that the tested hard drive may be tested at the various temperatures. According to steps S102 and S104, a partial bit error rate (PBERT) value of the tested hard drive is determined at a first temperature and at a second temperature. In some aspects, the PBERT value provides basic error rate functionality information of the tested hard drive. In some aspects, the PBERT value is given by $$PBERT_T = \frac{B_T}{E_T}, \quad (1)$$

where $B_T$ is the total number of bits on a media disk of the tested hard drive read at a particular temperature T, and $E_T$ is the total number of errors reading the media disk of the tested hard drive at the particular temperature T. The errors may include data address mark (DAM), error correcting code (ECC) errors, or other types of errors. Although the PBERT value is determined for a media disk (e.g., per head of the tested hard drive), the PBERT value may also be determined for a particular zone on the media disk rather than for the entire media disk. In some aspects, the higher the PBERT value, the better the performance of the tested hard drive (e.g., less errors relative to the number of bits on the media disk of the tested hard drive).

According to certain aspects, the first PBERT value is the PBERT value of the tested hard drive determined at the first temperature while the second PBERT value is the PBERT value of the tested hard drive determined at the second temperature. In some aspects, the first temperature at which the first PBERT value is determined is a hot temperature (e.g., between 55 degrees Celsius and 60 degrees Celsius). In some aspects, the second temperature at which the second PBERT value is determined is an ambient ("AMB") temperature (e.g., between 23 degrees Celsius and 27 degrees Celsius). By comparing PBERT values of the tested hard drive at the hot temperature and at the ambient temperature, consistency in the performance of the tested hard drive may be reliably determined. However, the first temperature and the second temperature may be other suitable temperatures provided that the first temperature is different from the second temperature. For example, in some aspects, the first temperature or the second temperature may be a cold temperature (e.g., between 0 degrees Celsius and 10 degrees Celsius).

Before the PBERT values of the tested hard drive are compared to determine the consistency in its performance, the tested hard drive may first be tested to determine whether it achieves a minimum level of performance. For example, whether the tested hard drive achieves the minimum level of performance may be determined by determining whether the minimum value of the first PBERT value and the second PBERT value is at least equal to a threshold value, known as a PBERT minimum limit. According to step S106, the PBERT minimum is determined based on the first PBERT value and the second PBERT value. In some aspects, the PBERT minimum is determined by computing a log of the first PBERT value and computing a log of the second PBERT value, wherein the PBERT minimum is a minimum of the log of the first PBERT value and the log of the second PBERT value. According to step S108, the determined PBERT minimum may be compared to a first PBERT minimum limit. According to various aspects of the subject technology, the first PBERT minimum limit specifies a minimum value that the PBERT minimum can be before the tested hard drive is considered a failure. If the PBERT minimum is less than the first PBERT minimum limit, then the tested hard drive is designated as a failure, and the failure indicator is generated, according to step S118.

According to certain aspects, the first PBERT minimum limit effectively sets a minimum level of performance of a particular hard drive. For example, the first PBERT minimum limit ensures that the log of the first PBERT value of the tested hard drive and the log of the second PBERT value of the tested hard drive is not each less than the first PBERT minimum limit. Otherwise, the tested hard drive may be considered a failure. In some aspects, the higher the first PBERT minimum limit, the better the performance of a hard drive that has a PBERT minimum at least equal to the first PBERT minimum limit. In some aspects, the higher the first PBERT minimum limit, the better the reliability of a hard drive that has a PBERT minimum at least equal to the first PBERT minimum limit (e.g., the hard drive is less likely to fail when used for operation).

Figure 2:
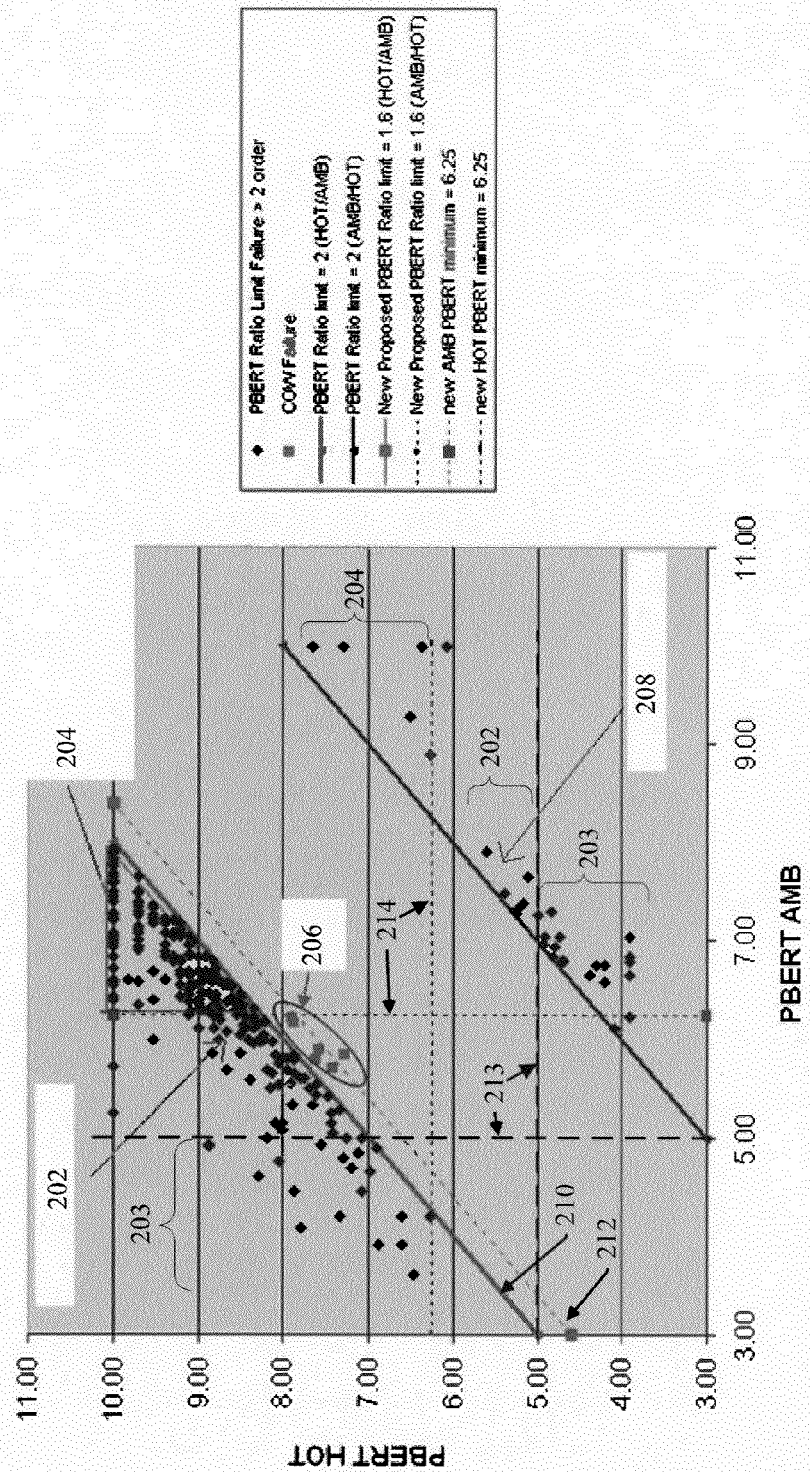
FIG. 2 illustrates an example of a plot of partial bit error rate values of various hard drives, in accordance with various aspects of the subject technology.

FIG. 2 illustrates an example of a plot of PBERT values of various hard drives, in accordance with various aspects of the subject technology. The log of PBERT values determined at the ambient temperature (e.g., the log of the second PBERT value) is represented on the X-axis, while the log of PBERT values determined at the hot temperature (e.g., the log of the first PBERT value) is represented on the Y-axis. As shown in FIG. 2, PBERT minimum limit 213 is an example of the first PBERT minimum limit, having a value of 5.00. Thus, hard drives 203, which have PBERT minimums less than PBERT minimum limit 213, are designated as failures.

If the PBERT minimum of the tested hard drive is greater than or equal to the first PBERT minimum limit, then a PBERT ratio is determined, according to steps S108 and S110. In some aspects, the PBERT ratio is determined based on the first PBERT value and the second PBERT value, and is used to determine the consistency in the performance of the tested hard drive at various temperatures. In some aspects, the PBERT ratio indicates a magnitude of the difference between the first PBERT value and the second PBERT value. In some aspects, the PBERT ratio may be determined by computing a log of the first PBERT value and computing a log of the second PBERT value, wherein the PBERT ratio is the absolute value of a difference between the log of the first PBERT value and the log of the second PBERT value. Thus, the higher the PBERT ratio, the larger the difference between the first PBERT value and the second PBERT value, thereby reflecting greater inconsistency in performance of the tested hard drive under the first temperature and the second temperature. In contrast, the lower the PBERT ratio, the smaller the difference between the first PBERT value and the second PBERT value, thereby reflecting greater consistency in performance of the tested hard drive under the first temperature and the second temperature.

As shown in FIG. 2, hard drives 202 have PBERT minimums greater than or equal to PBERT minimum limit 213 and also have PBERT ratios greater than 2.0. According to various aspects of the subject technology, a hard drive tester (e.g., a hard drive manufacturer) may set a PBERT ratio limit that specifies the maximum PBERT ratio that is allowed before the tested hard drive is considered a failure. PBERT ratio limit 210 and PBERT ratio limit 208 are examples of the PBERT ratio limit and are illustrated in FIG. 2. The value of PBERT ratio limit 210 and PBERT ratio limit 208 is 2.0. Because hard drives 202 have PBERT ratios greater than 2.0 (e.g., hard drives 202 are shown above PBERT ratio limit 210 or below PBERT ratio limit 208), hard drives 202 may be considered failures using the PBERT ratio limit 210 and the PBERT ratio limit 208 as test parameters.

To ensure reliability, a PBERT ratio limit may be set such that even hard drives having small PBERT ratios may be considered failures. However, setting the PBERT ratio limit too low may result in unnecessarily failing hard drives that may otherwise be suitable for use. In contrast, setting the PBERT ratio limit too high may result in incorrectly passing hard drives that may actually be failures. To balance these competing interests, hard drive manufacturers typically set the PBERT ratio limit at a standard level, giving about equal weight to each of these interests. PBERT ratio limit 210 and PBERT ratio limit 208 are examples of PBERT ratio limits set at the standard level (e.g., at the value of 2.0).

According to various aspects of the subject technology, the PBERT ratio limit may be set at a decreased level without having to fail more hard drives due to the decreased level. For example, the PBERT ratio limit may be set at a decreased level to advantageously fail hard drives having cold overwrite failures. Hard drives having cold overwrite failures are characterized in that these hard drives have heads with difficulties demagnetizing/desaturating media disks at cold temperatures (e.g., between 0 degrees Celsius and 10 degrees Celsius). This may be due to the fact that media magnetic coercivity is higher at colder temperatures. In theory, hard drives with cold overwrite failures have high PBERT ratios and typically have a significantly poor PBERT value (e.g., low PBERT value) at ambient temperatures. In practice, however, hard drives with cold overwrite failures may also have low PBERT ratios, with poor PBERT values at hot and/or ambient temperatures. In this regard, testing a hard drive using the PBERT ratio limit set at the standard level may not always fail hard drives with cold overwrite failures, especially those hard drives with cold overwrite failures having low PBERT ratios. For example, as shown in FIG. 2, hard drives 206 have cold overwrite failures and have relatively low PBERT ratios. These hard drives 206 have PBERT ratios under PBERT ratio limit 210 and PBERT ratio limit 208, and thus would be incorrectly passed using PBERT ratio limit 210 and PBERT ratio limit 208 as test parameters. According to certain aspects, PBERT ratio limit 212 is set at a decreased level (e.g., at a value of 1.6) compared to PBERT ratio limit 210 and PBERT ratio limit 208 to fail the majority of hard drives 206 having cold overwrite failures. Even though PBERT ratio limit 212 is set at the decreased level, more hard drives are not necessarily failed, as explained below.

According to step S112, the PBERT ratio of the tested hard drive is compared with the PBERT ratio limit. If the PBERT ratio is not greater than the PBERT ratio limit, then the tested hard drive is considered a passing hard drive and, therefore, a failure indicator is not generated, according to step S114. However, if the PBERT ratio is greater than the PBERT ratio limit, the tested hard drive is not automatically designated as a failure. Rather, an additional parameter is used to determine if the tested hard drive that has a PBERT ratio greater than the PBERT ratio limit is indeed a failure. In particular, the additional parameter is a second PBERT minimum limit that is used to determine if the tested hard drive is indeed a failure based on the PBERT minimum of the tested hard drive.

According to step S116, the PBERT minimum (e.g., as determined according to step S106) may be compared to the second PBERT minimum limit. According to various aspects of the subject technology, the second PBERT minimum limit specifies a second minimum value that the PBERT minimum can be before the tested hard drive is considered a failure. In other words, if the PBERT minimum is at least equal to the second PBERT minimum limit, then the failure indicator is not generated, according to step S114. If the PBERT minimum is less than the second PBERT minimum limit, then the tested hard drive is designated as a failure, and the failure indicator is generated, according to step S118.

According to certain aspects, the benefit of the second PBERT minimum limit is that an additional parameter may be used to test hard drives while taking into account the competing interests of increasing or decreasing the PBERT ratio limit. Because the PBERT ratio limit is set at the decreased level, the concern is that more hard drives would be unnecessarily failed due to the decreased PBERT ratio limit. The second PBERT minimum limit addresses this concern by providing an additional parameter to pass hard drives that have a PBERT minimum at least equal to the second PBERT minimum limit, including hard drives that would otherwise fail based solely on having PBERT ratios greater than the PBERT ratio limit. In some aspects, the second PBERT minimum limit ensures that the log of the first PBERT value of the tested hard drive and the log of the second PBERT value of the tested hard drive is not each less than the second PBERT minimum limit. Otherwise, the tested hard drive may be considered a failure if its PBERT ratio is also greater than the PBERT ratio limit.

According to various aspects of the subject technology, the second PBERT minimum limit may be set above PBERT minimums of hard drives having cold overwrite failures and of the same type as the tested hard drive. Thus, hard drives with cold overwrite failures will not be incorrectly passed because these hard drives will not have PBERT minimums greater than or equal to the second PBERT minimum limit. Furthermore, hard drives that have PBERT minimums greater than or equal to the second PBERT minimum limit will be passed regardless of whether the PBERT ratios of these hard drives are greater than or less than the PBERT ratio limit. In this regard, by using the second PBERT minimum limit, hard drives having cold overwrite failures may be failed, and at the same time, the concern that more hard drives would be unnecessarily failed due to a decreased PBERT ratio limit may be addressed.

As shown in FIG. 2, PBERT minimum limit 214 is an example of the second PBERT minimum limit, having a value of 6.25. PBERT minimum limit 214 is set such that it is above the PBERT minimums of hard drives 206 having cold overwrite errors. Furthermore, the region of hard drives 204 that have PBERT minimums greater than or equal to PBERT minimum limit 214 will be passed even though the PBERT ratios of these hard drives are greater than PBERT ratio limit 210. Thus, by using a combination of the second PBERT minimum limit and the PBERT ratio limit, more hard drives can be passed without incorrectly passing hard drives that are failures (e.g., hard drives having cold overwrite failures).

According to various aspects of the subject technology, the failure indicator may be generated if (a) the PBERT minimum is less than the first PBERT minimum limit and/or if (b) the PBERT ratio is greater than the PBERT ratio limit and the PBERT minimum is less than the second PBERT minimum limit. Otherwise, the tested hard drive may be considered a passing hard drive. The PBERT ratio limit and the second PBERT minimum limit may be used in combination to reliably test hard drives without unnecessarily failing too many hard drives that are otherwise suitable for use.

The following table presents examples of hard drives tested under method 100, in accordance with various aspects of the subject technology. In these examples, the PBERT ratio limit is set at 2.0, the first PBERT minimum limit is set at 5.0, and the second PBERT minimum limit is set at 6.25.

| | Log of first PBERT value | Log of second PBERT value | PBERT ratio | PBERT minimum | Failure indicator generated? |
|---|---|---|---|---|---|
| Hard drive A | 9.0 | 6.9 | 2.1 | 6.9 | No |
| Hard drive B | 9.0 | 6.0 | 3.0 | 6.0 | Yes |
| Hard drive C | 9.0 | 7.1 | 1.9 | 7.1 | No |
| Hard drive D | 7.5 | 6.0 | 1.5 | 6.0 | No |
| Hard drive E | 4.0 | 4.0 | 0.0 | 4.0 | Yes |

As shown in the examples presented in the previous table, the failure indicator is generated for hard drive B because the PBERT ratio (3.0) is greater than the PBERT ratio limit (2.0) and the PBERT minimum (6.0) is less than the second PBERT minimum limit (6.25). The failure indicator is also generated for hard drive E because the PBERT minimum (4.0) is less than the first PBERT minimum limit (5.0). The failure indicators are not generated for the other hard drives.

Figure 3:
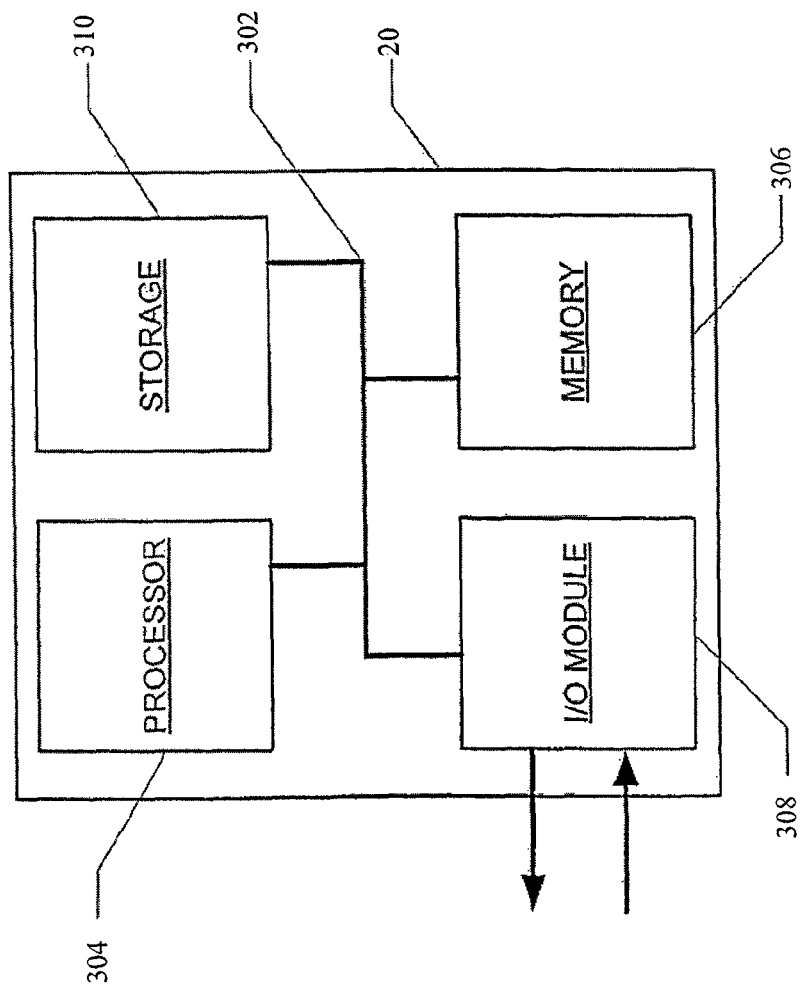
FIG. 3 is a block diagram illustrating components of a controller, in accordance with various aspects of the subject disclosure.

FIG. 3 is a block diagram illustrating components of controller 20, in accordance with various aspects of the subject disclosure. Controller 20 comprises processor module 304, storage module 310, input/output (I/O) module 308, memory module 306, and bus 302. Bus 302 may be any suitable communication mechanism for communicating information. Processor module 304, storage module 310, I/O module 308, and memory module 306 are coupled with bus 302 for communicating information between any of the modules of controller 20 and/or information between any module of controller 20 and a device external to controller 20. For example, information communicated between any of the modules of controller 20 may include instructions and/or data. In some aspects, bus 302 may be a universal serial bus. In some aspects, bus 302 may provide Ethernet connectivity.

In some aspects, processor module 304 may comprise one or more processors, where each processor may perform different functions or execute different instructions and/or processes. For example, one or more processors may execute instructions for executing method 100, and one or more processors may execute instructions for input/output functions.

Memory module 306 may be random access memory ("RAM") or other dynamic storage devices for storing information and instructions to be executed by processor module 304. Memory module 306 may also be used for storing temporary variables or other intermediate information during execution of instructions by processor 204. In some aspects, memory module 306 may comprise battery-powered static RAM, which stores information without requiring power to maintain the stored information. Storage module 310 may be a magnetic disk or optical disk and may also store information and instructions. In some aspects, storage module 310 may comprise hard disk storage or electronic memory storage (e.g., flash memory). In some aspects, memory module 306 and storage module 310 are both a machine-readable medium.

Controller 20 is coupled via I/O module 308 to a user interface for providing information to and receiving information from a hard drive tester implementing method 100. For example, the user interface may be a cathode ray tube ("CRT") or LCD monitor for displaying information to the hard drive tester. The user interface may also include, for example, a keyboard or a mouse coupled to controller 20 via I/O module 308 for communicating information and command selections to processor module 304. In some aspects, once the failure indicator is generated, the hard drive tester may be notified via the user interface.

According to various aspects of the subject disclosure, methods described herein are executed by controller 20. Specifically, processor module 304 executes one or more sequences of instructions contained in memory module 306 and/or storage module 310. In one example, instructions may be read into memory module 306 from another machine-readable medium, such as storage module 310. In another example, instructions may be read directly into memory module 306 from I/O module 308, for example from the hard drive tester implementing method 100 via the user interface. Execution of the sequences of instructions contained in memory module 306 and/or storage module 310 causes processor module 304 to perform methods test a hard drive. For example, a computational algorithm for testing a hard drive may be stored in memory module 306 and/or storage module 310 as one or more sequences of instructions. Information such as the first PBERT value, the second PBERT value, the PBERT ratio, the PBERT ratio limit, the PBERT minimum, the first PBERT minimum limit, and the second PBERT minimum limit may be communicated from processor module 304 to memory module 306 and/or storage module 310 via bus 302 for storage. In some aspects, the information may be communicated from processor module 304, memory module 306, and/or storage module 310 to I/O module 308 via bus 302. The information may then be communicated from I/O module 308 to the hard drive tester via the user interface.

One or more processors in a multi-processing arrangement may also be employed to execute the sequences of instructions contained in memory module 306 and/or storage module 310. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 304 for execution. Such a medium may take many forms, including, but not limited to, non-volatile media, volatile media, and transmission media. Non-volatile media include, for example, optical or magnetic disks, such as storage module 310. Volatile media include dynamic memory, such as memory module 306. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "above," "below," "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for testing a hard drive, the method comprising:
    determining a first partial bit error rate (PBERT) value of a hard drive at a first temperature and a second PBERT value of the hard drive at a second temperature, wherein the first temperature is greater than the second temperature;
    determining a PBERT minimum based on the first PBERT value and the second PBERT value;
    comparing the PBERT minimum to a first PBERT minimum limit;
    determining a PBERT ratio based on the first PBERT value and the second PBERT value if the PBERT minimum is greater than or equal to the first PBERT minimum limit;
    comparing the PBERT ratio to a PBERT ratio limit;

comparing the PBERT minimum to a second PBERT minimum limit if the PBERT ratio is greater than the PBERT ratio limit; and generating a failure indicator of the hard drive if the PBERT minimum is less than the first PBERT minimum limit and/or the second PBERT minimum limit.

2. The method of claim 1, wherein the first PBERT value is given by $$\frac{B_1}{E_1},$$

where $B_1$ is a total number of bits on a media disk of the hard drive read at the first temperature, and $E_1$ is a total number of errors reading the media disk of the hard drive at the first temperature, and wherein the second PBERT value is given by $$\frac{B_2}{E_2},$$

where $B_2$ is a total number of bits on the media disk of the hard drive read at the second temperature, and $E_2$ is a total number of errors reading the media disk of the hard drive at the second temperature.

3. The method of claim 1, wherein the first temperature is between 55 degrees Celsius and 60 degrees Celsius, and the second temperature is between 23 degrees Celsius and 27 degrees Celsius.

4. The method of claim 1, wherein determining the PBERT ratio comprises:
computing a log of the first PBERT value; and
computing a log of the second PBERT value,
wherein the PBERT ratio is an absolute value of a difference between the log of the first PBERT value and the log of the second PBERT value.

5. The method of claim 1, wherein determining the PBERT minimum comprises:
computing a log of the first PBERT value; and
computing a log of the second PBERT value,
wherein the PBERT minimum is a minimum of the log of the first PBERT value and the log of the second PBERT value.

6. The method of claim 1, wherein the failure indicator is generated if the PBERT ratio is greater than the PBERT ratio limit and if the PBERT minimum is less than the second PBERT minimum limit.

7. The method of claim 1, wherein the second PBERT minimum limit is set above PBERT minimums of hard drives having cold overwrite failures and of the same type as the hard drive.

8. The method of claim 1, wherein the PBERT ratio limit is set below PBERT ratios of hard drives having cold overwrite failures and of the same type as the hard drive.

9. A non-transitory machine-readable medium encoded with executable instructions for testing a hard drive, the instructions comprising code for:
determining a first partial bit error rate (PBERT) value of a hard drive at a first temperature and a second PBERT value of the hard drive at a second temperature, wherein the first temperature is greater than the second temperature;
determining a PBERT minimum based on the first PBERT value and the second PBERT value;

comparing the PBERT minimum to a first PBERT minimum limit;
determining a PBERT ratio based on the first PBERT value and the second PBERT value if the PBERT minimum is greater than or equal to the first PBERT minimum limit;
comparing the PBERT ratio to a PBERT ratio limit;
comparing the PBERT minimum to a second PBERT minimum limit if the PBERT ratio is greater than the PBERT ratio limit; and
generating a failure indicator of the hard drive if the PBERT minimum is less than the first PBERT minimum limit and/or the second PBERT minimum limit.

10. The non-transitory machine-readable medium of claim 9, wherein the first PBERT value is given by $$\frac{B_1}{E_1},$$

where $B_1$ is a total number of bits on a media disk of the hard drive read at the first temperature, and $E_1$ is a total number of errors reading the media disk of the hard drive at the first temperature, and wherein the second PBERT value is given by $$\frac{B_2}{E_2},$$

where $B_2$ is a total number of bits on the media disk of the hard drive read at the second temperature, and $E_2$ is a total number of errors reading the media disk of the hard drive at the second temperature.

11. The non-transitory machine-readable medium of claim 9, wherein determining the PBERT ratio comprises:
computing a log of the first PBERT value; and
computing a log of the second PBERT value,
wherein the PBERT ratio is an absolute value of a difference between the log of the first PBERT value and the log of the second PBERT value.

12. The non-transitory machine-readable medium of claim 9, wherein determining the PBERT minimum comprises:
computing a log of the first PBERT value; and
computing a log of the second PBERT value,
wherein the PBERT minimum is a minimum of the log of the first PBERT value and the log of the second PBERT value.

13. The non-transitory machine-readable medium of claim 9, wherein the failure indicator is generated if the PBERT ratio is greater than the PBERT ratio limit and if the PBERT minimum is less than the PBERT minimum limit.

14. The non-transitory machine-readable medium of claim 9, wherein the second PBERT minimum limit is set above PBERT minimums of hard drives having cold overwrite failures and of the same type as the hard drive.

15. The non-transitory machine-readable medium of claim 9, wherein the PBERT ratio limit is set below PBERT ratios of hard drives having cold overwrite failures and of the same type as the hard drive.

16. A controller for testing a hard drive, the controller comprising:
a memory module containing executable instructions; and
a processor configured to execute the instructions to perform a method for:

determining a first partial bit error rate (PBERT) value of a hard drive at a first temperature and a second PBERT value of the hard drive at a second temperature, wherein the first temperature is greater than the second temperature;

determining a PBERT minimum based on the first PBERT value and the second PBERT value;

comparing the PBERT minimum to a first PBERT minimum limit;

determining a PBERT ratio based on the first PBERT value and the second PBERT value if the PBERT minimum is greater than or equal to the first PBERT minimum limit;

comparing the PBERT ratio to a PBERT ratio limit;

comparing the PBERT minimum to a second PBERT minimum limit if the PBERT ratio is greater than the PBERT ratio limit; and generating a failure indicator of the hard drive if the PBERT minimum is less than the first PBERT minimum limit and/or the second PBERT minimum limit.

17. The controller of claim 16,
wherein the first PBERT value is given by $$\frac{B_1}{E_1},$$

where $B_1$ is a total number of bits on a media disk of the hard drive read at the first temperature, and $E_1$ is a total number of errors reading the media disk of the hard drive at the first temperature, and wherein the second PBERT value is given by $$\frac{B_2}{E_2},$$

where $B_2$ is a total number of bits on the media disk of the hard drive read at the second temperature, and $E_2$ is a total number of errors reading the media disk of the hard drive at the second temperature.

18. The controller of claim 16, wherein determining the PBERT ratio comprises:

computing a log of the first PBERT value; and computing a log of the second PBERT value, wherein the PBERT ratio is an absolute value of a difference between the log of the first PBERT value and the log of the second PBERT value.

19. The controller of claim 16, wherein determining the PBERT minimum comprises:

computing a log of the first PBERT value; and computing a log of the second PBERT value, wherein the PBERT minimum is a minimum of the log of the first PBERT value and the log of the second PBERT value.

20. The controller of claim 16, wherein the failure indicator is generated if the PBERT ratio is greater than the PBERT ratio limit and if the PBERT minimum is less than the second PBERT minimum limit.

* * * * *